United States Patent
Scott et al.

(10) Patent No.: US 10,011,350 B2
(45) Date of Patent: Jul. 3, 2018

(54) VERTICAL TAKE-OFF AND LANDING DRAG RUDDER

(71) Applicant: Sikorsky Aircraft Corporation, Stratford, CT (US)

(72) Inventors: Mark W. Scott, Bethany, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 526 days.

(21) Appl. No.: 14/717,770

(22) Filed: May 20, 2015

(65) Prior Publication Data

US 2016/0375998 A1    Dec. 29, 2016

Related U.S. Application Data

(60) Provisional application No. 62/000,665, filed on May 20, 2014.

(51) Int. Cl.
*B64C 27/22*    (2006.01)
*B64C 29/02*    (2006.01)
*B64C 5/08*     (2006.01)
*B64C 9/00*     (2006.01)

(52) U.S. Cl.
CPC ............. *B64C 29/02* (2013.01); *B64C 5/08* (2013.01); *B64C 9/00* (2013.01)

(58) Field of Classification Search
CPC ........ B64C 2201/088; B64C 2201/165; B64C 29/0025; B64C 29/02; B64C 39/024; B64C 11/001; B64C 11/48; B64C 15/00; B64C 2201/02; B64C 2201/021; B64C 2201/104; B64C 2201/108; B64C 3/50; B64C 5/08; B64C 9/00; Y02T 50/145
See application file for complete search history.

(56) References Cited

U.S. PATENT DOCUMENTS

| | | | | |
|---|---|---|---|---|
| 3,966,142 A | * | 6/1976 | Corbett | B64C 1/30 244/12.4 |
| 4,085,911 A | * | 4/1978 | Nahodyl | B64C 1/30 244/12.4 |
| 4,247,062 A | * | 1/1981 | Brueckner | B64C 5/08 244/36 |
| 4,598,885 A | * | 7/1986 | Waitzman | B64C 3/185 244/13 |
| 4,722,499 A | * | 2/1988 | Klug | B64C 23/065 244/199.4 |
| 5,056,737 A | * | 10/1991 | Taylor | B64C 25/66 244/100 R |
| 5,062,587 A | * | 11/1991 | Wernicke | B64C 29/02 244/100 R |
| 5,114,096 A | * | 5/1992 | Wernicke | B64C 29/02 244/45 A |

(Continued)

*Primary Examiner* — Medhat Badawi
(74) *Attorney, Agent, or Firm* — Cantor Colburn LLP

(57) ABSTRACT

A system for a tail-sitter aircraft includes a fuselage having one or more propellers, a wing structure coupled to the fuselage, and a drag rudder assembly coupled to the wing structure, the drag rudder assembly including a first planar member that is coupled to a second planar member. The drag rudder assembly is configured to produce a stabilizing force on the wing structure during higher speeds of the aircraft in tandem rotor flight.

14 Claims, 2 Drawing Sheets

(56) References Cited

U.S. PATENT DOCUMENTS

| | | | | |
|---|---|---|---|---|
| 5,407,150 A * | 4/1995 | Sadleir | B64C 29/0025 244/12.4 |
| 6,345,790 B1 * | 2/2002 | Brix | B64C 23/065 244/199.4 |
| 6,471,158 B1 * | 10/2002 | Davis | B64C 27/02 244/8 |
| 8,439,313 B2 * | 5/2013 | Rawdon | B64C 23/065 244/199.4 |
| 9,085,354 B1 * | 7/2015 | Peeters | B64C 29/02 |
| 9,688,398 B2 * | 6/2017 | Page | B64C 29/02 |
| 9,731,820 B1 * | 8/2017 | Godlasky | B64D 27/02 |
| 2005/0178879 A1 * | 8/2005 | Mao | B64C 29/02 244/7 B |
| 2006/0186261 A1 * | 8/2006 | Unzicker | B64C 3/50 244/12.1 |
| 2011/0031355 A1 * | 2/2011 | Alvarez Calderon F. | B64C 3/10 244/7 R |
| 2012/0248259 A1 * | 10/2012 | Page | B64C 29/02 244/7 A |
| 2012/0286102 A1 | 11/2012 | Sinha | |
| 2013/0206921 A1 * | 8/2013 | Paduano | B64C 29/0033 244/7 C |
| 2014/0217229 A1 * | 8/2014 | Chan | B64C 29/02 244/6 |
| 2015/0102157 A1 * | 4/2015 | Godlasky | B64D 27/02 244/13 |
| 2015/0203190 A1 * | 7/2015 | Witte | B64C 23/065 244/199.4 |
| 2016/0009404 A1 * | 1/2016 | Newman | F02K 3/00 701/3 |
| 2016/0023753 A1 * | 1/2016 | Alber | B64C 29/02 244/6 |
| 2016/0046382 A1 * | 2/2016 | Alber | B64C 29/02 701/3 |
| 2016/0144957 A1 * | 5/2016 | Claridge | B64C 29/02 244/6 |
| 2016/0272313 A1 * | 9/2016 | Chan | A63H 27/12 |
| 2016/0304196 A1 * | 10/2016 | Alber | B64C 29/02 |
| 2016/0311553 A1 * | 10/2016 | Alber | B64D 39/04 |
| 2016/0375998 A1 * | 12/2016 | Scott | B64C 29/02 244/7 B |
| 2017/0190412 A1 * | 7/2017 | Bunting | B64C 5/10 |
| 2017/0217585 A1 * | 8/2017 | Hulsman | B64C 29/02 |

* cited by examiner

VERTICAL TAKE-OFF AND LANDING DRAG RUDDER

CROSS-REFERENCE TO RELATED APPLICATIONS

This application claims the benefit of U.S. provisional patent application Ser. No. 62/000,665, filed May 20, 2014, the entire contents of which are incorporated herein by reference.

FIELD OF THE INVENTION

The subject matter disclosed herein relates generally to the field of rotorcraft, and to a vertical take-off and landing tail-sitter aircraft with an asymmetric drag rudder at a wing tip for providing directional stability during hover flight.

DESCRIPTION OF RELATED ART

Typically, a vertical take-off and landing (VTOL) aircraft, e.g., a helicopter, tiltrotor, tiltwing, or a tail-sitter aircraft, can be airborne from a relatively confined space. Tail-sitter aircraft have a fuselage that is vertically disposed during take-off and hover and which transitions from a vertical flight state (i.e., rotor borne) to a horizontal flight-state (i.e., wing borne). In an example, some tail-sitter aircraft do not have a conventional empennage. This is called a proprotor tail-sitter aircraft because stability and control is derived from wing mounted proprotors. As a result, the proprotor tail-sitter aircraft can be used in certain confined environments, such as in an urban area or on a flight deck of a ship, while other VTOL aircraft, due to their size, have limited applicability. A proprotor tail-sitter aircraft flies in a tandem rotor configuration in low speed flight whereby one wingtip acts as the nose of the aircraft and the other wingtip is the tail. However, as flight speed in tandem mode increases, the directional stability of the aircraft becomes more unstable due to the lack of a conventional empennage. A proprotor tail-sitter aircraft that has natural directional stability in a tandem mode flight is desired.

BRIEF SUMMARY

According to an aspect of the invention, a method for controlling a tail-sitter aircraft, includes providing a fuselage having one or more propellers; attaching a wing structure to the fuselage; and coupling a drag rudder assembly to the wing structure, where the drag rudder assembly including a first planar member that is coupled to a second planar member.

In addition to one or more of the features described above, or as an alternative, further embodiments could include a drag rudder assembly that produces a stabilizing force on the wing structure during higher speeds of the aircraft in tandem rotor flight.

In addition to one or more of the features described above, or as an alternative, further embodiments could include selectively retracting the drag rudder assembly from a first position to a second position, where the first planar member is at an angle to the second planar member in the first position; and where the first planar member is parallel to the second planar member and the wing structure in the second planar position.

In addition to one or more of the features described above, or as an alternative, further embodiments could include forming a fixed acute angle with each of the first and second planar members to the wing structure.

In addition to one or more of the features described above, or as an alternative, further embodiments could include forming a variable acute angle with each of the first and second planar members to the wing structure.

In addition to one or more of the features described above, or as an alternative, further embodiments could include forming the fixed or variable acute angle from about 15 degrees to about 60 degrees.

In addition to one or more of the features described above, or as an alternative, further embodiments could include providing the acute angle for the first planar member that is different than the acute angle for the second planar member.

In addition to one or more of the features described above, or as an alternative, further embodiments could include providing the acute angle for the first planar member that is the same as the acute angle of the second planar member.

In addition to one or more of the features described above, or as an alternative, further embodiments could include configuring the drag rudder assembly to be coupled to an aft-end of the wing structure.

According to another aspect of the invention, a system for a tail-sitter aircraft, includes a fuselage having one or more propellers; a wing structure coupled to the fuselage; and a drag rudder assembly coupled to the wing structure, the drag rudder assembly having a first planar member that is coupled to a second planar member.

In addition to one or more of the features described above, or as an alternative, further embodiments could include a drag rudder assembly that is configured to produce a stabilizing force on the wing structure during higher speeds of the aircraft in tandem rotor flight.

In addition to one or more of the features described above, or as an alternative, further embodiments could include a drag rudder assembly that is configured to be selectively retracted from a first position to a second position; where the first planar member is at an angle to the second planar member in the first position; and where the first planar member is parallel to the second planar member and the wing structure in the second planar position.

In addition to one or more of the features described above, or as an alternative, further embodiments could include each of the first and second planar members form a fixed acute angle with the wing structure.

In addition to one or more of the features described above, or as an alternative, further embodiments could include each of the first and second planar members form a variable acute angle with the wing structure.

In addition to one or more of the features described above, or as an alternative, further embodiments could include a fixed or variable acute angle that is from about 15 degrees to about 60 degrees.

In addition to one or more of the features described above, or as an alternative, further embodiments could include an acute angle of the first planar member that is different than the acute angle of the second planar member.

In addition to one or more of the features described above, or as an alternative, further embodiments could include an acute angle of the first planar member that is the same as the acute angle of the second planar member.

In addition to one or more of the features described above, or as an alternative, further embodiments could include a drag rudder assembly that is configured to be coupled to an aft-end of the wing structure.

Technical function of a wing drag rudder at one end of a wing structure for a VTOL tail-sitter aircraft is to provide directional stability at higher speeds during tandem rotor flight, to provide minimal performance impact during wing-borne flight, and minimal to no impact on the aircraft's overall footprint to operate in certain confined environments.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
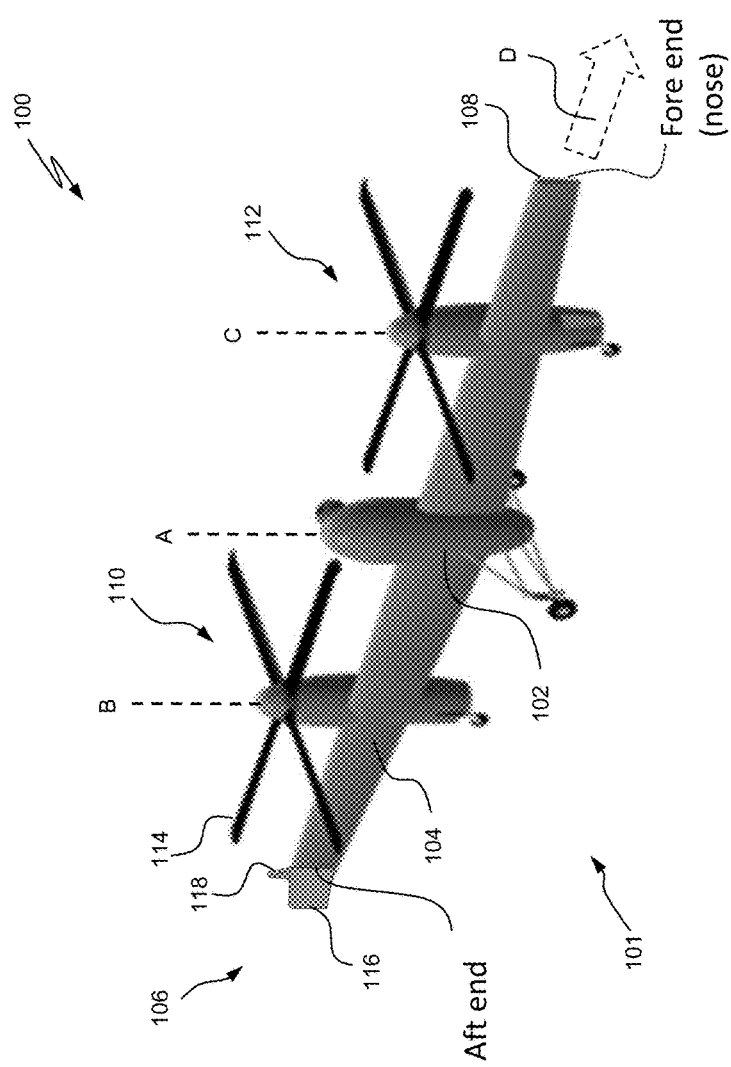
FIG. 1 is a perspective view of an exemplary aircraft during tandem rotor flight according to an embodiment of the invention.
Figure 2:
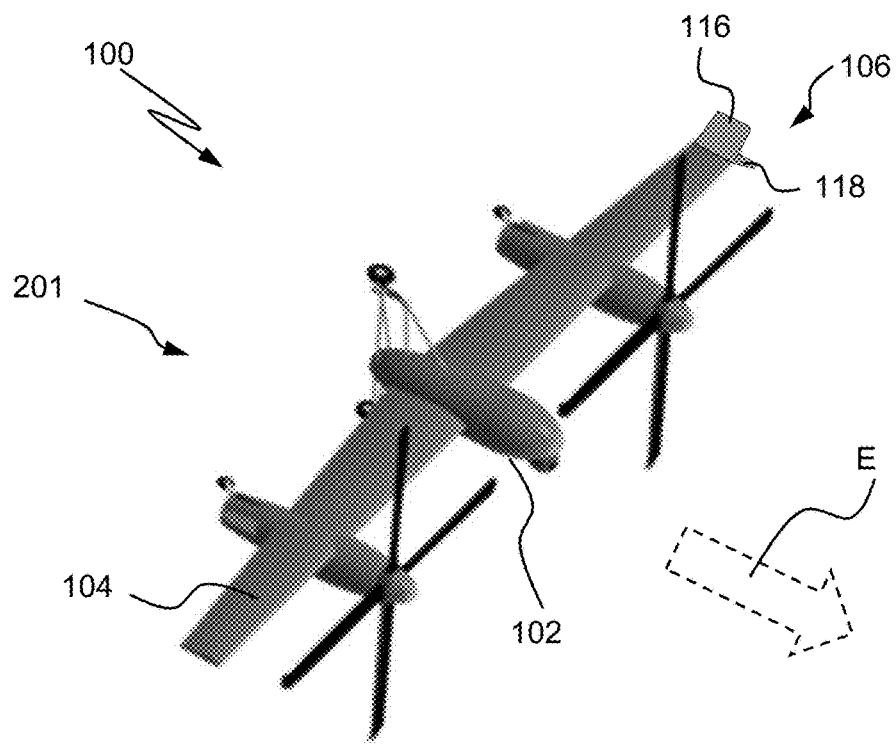
FIG. 2 is a perspective view of the exemplary aircraft of FIG. 1 but is shown during horizontal flight according to an embodiment of the invention.
Figure 3:
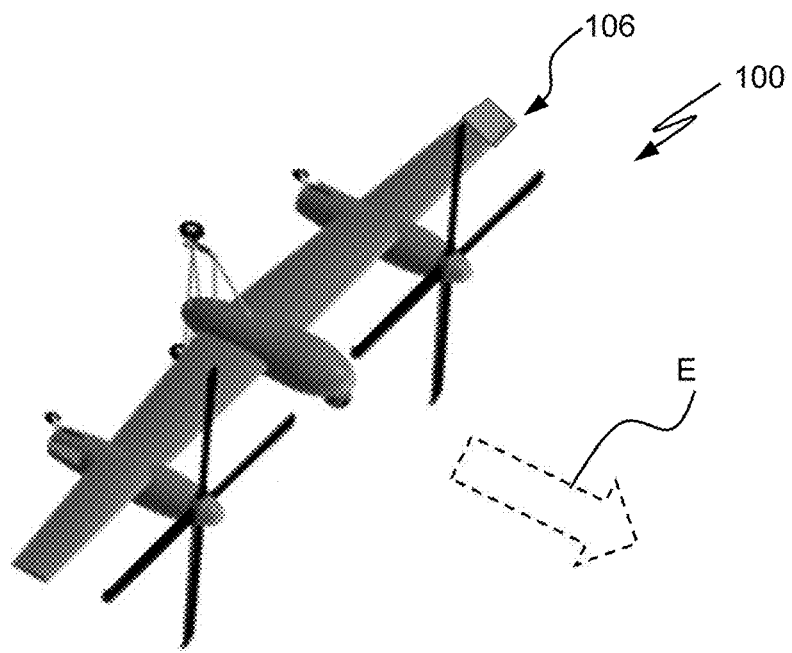
FIG. 3 is a perspective view of the exemplary aircraft of FIG. 1 in horizontal flight according to another embodiment of the invention.

Referring now to the drawings, FIGS. 1-3 illustrate a perspective of an exemplary vertical take-off and landing (VTOL) vehicle in the form of a proprotor tail-sitter aircraft 100 according to an embodiment of the invention. As illustrated, tail-sitter aircraft 100 includes a fuselage 102, an elongated wing structure 104 attached to fuselage 102, and a drag rudder assembly 106 at one wingtip. Although a particular configuration of a proprotor tail-sitter aircraft 100 is illustrated and described in the disclosed embodiments, it will be appreciated that other VTOL tail-sitter configurations of aircraft that can operate in confined areas on land or on water including fixed-wing aircraft, tiltrotor aircraft, tiltwing aircraft, and other tail-sitting VTOL aircraft including micro air- or organic air-vehicles may also benefit from embodiments disclosed.

As illustrated in FIG. 1, an exemplary tail-sitter aircraft 100 is shown in tandem rotor flight mode 101 (i.e., rotor-borne flight state) whereby aircraft 100 propels forward in a direction of arrow D (i.e., from leading wingtip to trailing wingtip). In this tandem rotor flight mode 101, longitudinal axis A of fuselage 102 is oriented in a vertical direction with respect to the ground plane with a leading wingtip 108 (forward-end) being a nose of aircraft 100 and drag rudder assembly 106 at an aft-end being a tail of aircraft 100. Fuselage 102 is aligned at aircraft 100 center of gravity in the tandem rotor flight mode 101. Fuselage 102 is generally located in the middle of wing structure 104, which is generally orthogonal to longitudinal axis A of fuselage 102 and substantially parallel to the ground plane. A plurality of propellers 110, 112 are mounted to wing structure 104 along respective axes B, C. Propellers 110, 112 include substantially similar propeller blades 114 that provide thrust during hover, tandem rotor flight, and horizontal flight (wing-borne flight). Tail-sitter aircraft 100 includes a drag rudder assembly 106 attached to an aft-end of wing structure 104 aft of fuselage 102 (aft of center of gravity of aircraft 100). Drag rudder assembly 106 is generally "V-shaped" and is formed from substantially planar members 116, 118 attached at an acute angle to wingtip so as to split wing tip into two surfaces. Particularly, each member 116, 118 is positioned on wing structure 104 so as to form an acute angle with wing structure 104. In an embodiment, each member 116, 118 forms an angle from about 15 degrees to about 60 degrees with a plane that is parallel to longitudinal axis of wing structure 104. The angle may be fixed or be selectively changed through actuators. For example, members 116, 118 can be selectively movable through actuators and linkages such that an angle for member 116 can vary from between 15 degrees and 60 degrees while member 118 can be at the same or different angle than member 116. In addition to the acute angles described above, drag rudder assembly 106 can also be selectively retracted during flight such that members 116, 118 are substantially parallel to a plane that is parallel to wing structure 104 as shown in FIG. 3. In operation, drag rudder assembly 106 is asymmetric about the forward flight longitudinal axis and functions as a bluff body in tandem rotor flight mode 101. As a result, drag rudder assembly 106 produces a large separated wake, and, therefore, drag at distal end of wing structure 104. This drag creates a stabilizing directional, i.e. yaw, force in tandem rotor flight mode 101.

FIGS. 2-3 illustrate tail-sitter aircraft 100 in an airplane mode 201 (i.e., wing-borne flight state) whereby aircraft 100 propels forward in a direction of arrow E (i.e., from wingtip to wingtip). In the airplane mode 201, fuselage 102 is aligned in a direction of arrow E and longitudinal axis of wing structure 104 can be substantially parallel with the ground plane. Also, wing structure 104 is configured to provide lift when tail-sitter aircraft 100 is in airplane mode 201. As shown in FIG. 2, drag rudder assembly 106 is a split tip design with each member 116, 118 being positioned on wing structure 104 so as to form an acute angle with wing structure 104. In operation, drag rudder assembly 106 can act as winglets and provide aerodynamic efficiency by reducing aircraft 100 drag by partial recovery of the tip vortex energy at wingtip adjacent drag rudder assembly 106.

In an alternative embodiment, as illustrated in FIG. 3, drag rudder assembly 106 is shown where members 116, 118 (FIG. 2) are selectively retracted during flight such that members 116, 118 are parallel to each other and substantially parallel to a plane that is parallel to wing structure 104. In the retracted position, drag rudder assembly 106 forms a conventional wingtip in airplane mode.

Benefits of the embodiments described herein provide improved directional stability at higher speeds for aircraft in tandem mode flight through a drag rudder assembly coupled to an end of a wing structure. The drag rudder assembly can produce a large separated wake, and, therefore, drag at the end of wing structure to create a stabilizing directional, i.e. yaw, force in tandem rotor flight mode. Other benefits include minimal airplane mode performance impact as well as no impact on the aircraft's overall footprint, which provides advantages for shipboard applications.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for a tail-sitter aircraft, comprising:
   a fuselage having one or more propellers;
   a wing structure coupled to the fuselage; and
   a drag rudder assembly coupled to the wing structure, the drag rudder assembly including a first planar member that is coupled to a second planar member, the first planar member and the second planar member are coupled to the wing structure;
   wherein the aircraft is transformable between a tandem rotor flight mode where a longitudinal axis of the fuselage is oriented in a vertical direction relative to a ground plane and an airplane mode where the longitudinal axis of the fuselage is parallel to the ground plane, and at least one of the first planar member and the second planar member is adjustable between a first position and a second position based on whether the aircraft is in the tandem rotor flight mode or the aircraft mode, wherein in the first position, the first planar member and the second planar member are arranged at an acute angle between about 15 degrees and about 60 degrees with a plane that is parallel to a longitudinal axis of the wing structure in a direction away from the fuselage, and in the second position, the first planar member is parallel to the second planar member and the wing structure.

2. The system of claim 1, wherein the drag rudder assembly is configured to produce a stabilizing force on the wing structure during operation of the aircraft in the tandem rotor flight mode.

3. The system of claim 1, wherein at least one of the first and second planar members is fixed at the acute angle with the wing structure.

4. The system of claim 1, wherein each of the first and second planar members is adjustable to vary the acute angle.

5. The system of claim 1, wherein the acute angle of the first planar member is not equal to the acute angle of the second planar member.

6. The system claim 1, wherein the acute angle of the first planar member is the same as the acute angle of the second planar member.

7. The system of claim 1, wherein the drag rudder assembly is coupled to an aft-end of the wing structure.

8. A method for controlling a tail-sitter aircraft, comprising:
   providing a fuselage having one or more propellers, the fuselage transforming between a tandem rotor flight mode where a longitudinal axis of the fuselage is oriented in a vertical direction relative to a ground plane and an airplane mode where the longitudinal axis of the fuselage is parallel to the ground plane;
   attaching a wing structure to the fuselage;
   coupling a drag rudder assembly to the wing structure, the drag rudder assembly including a first planar member that is coupled to a second planar member,
   adjusting a position of at least one of the first planar member and the second planar member between a first position and a second position, based on whether the aircraft is in the tandem rotor flight mode or the aircraft mode, wherein in the first position, the first planar member and the second planar member are arranged at an acute angle between about 15 degrees and about 60 degrees with a plane that is parallel to a longitudinal axis of the wing structure in a direction away from the fuselage, and in the second position, the first planar member is parallel to the second planar member and the wing structure.

9. The method of claim 8, wherein the drag rudder assembly produces a stabilizing force on the wing structure during operation of the aircraft in tandem rotor flight mode.

10. The method of claim 8, wherein the acute angle of at least one of the first planar member and the second planar member is fixed.

11. The method of claim 8, wherein the acute angle of the first planar member and the second planar member is variable.

12. The method of claim 8, further comprising providing the acute angle for the first planar member and the acute angle for the second planar member, wherein the acute angle for the first planar member is not equal to the acute angle for the second planar member.

13. The method claim 8, further comprising providing the acute angle for the first planar member that is the same as the acute angle of the second planar member.

14. The method of claim 8, further comprising coupling the drag rudder assembly to an aft-end of the wing structure.

* * * * *